Patented July 11, 1939

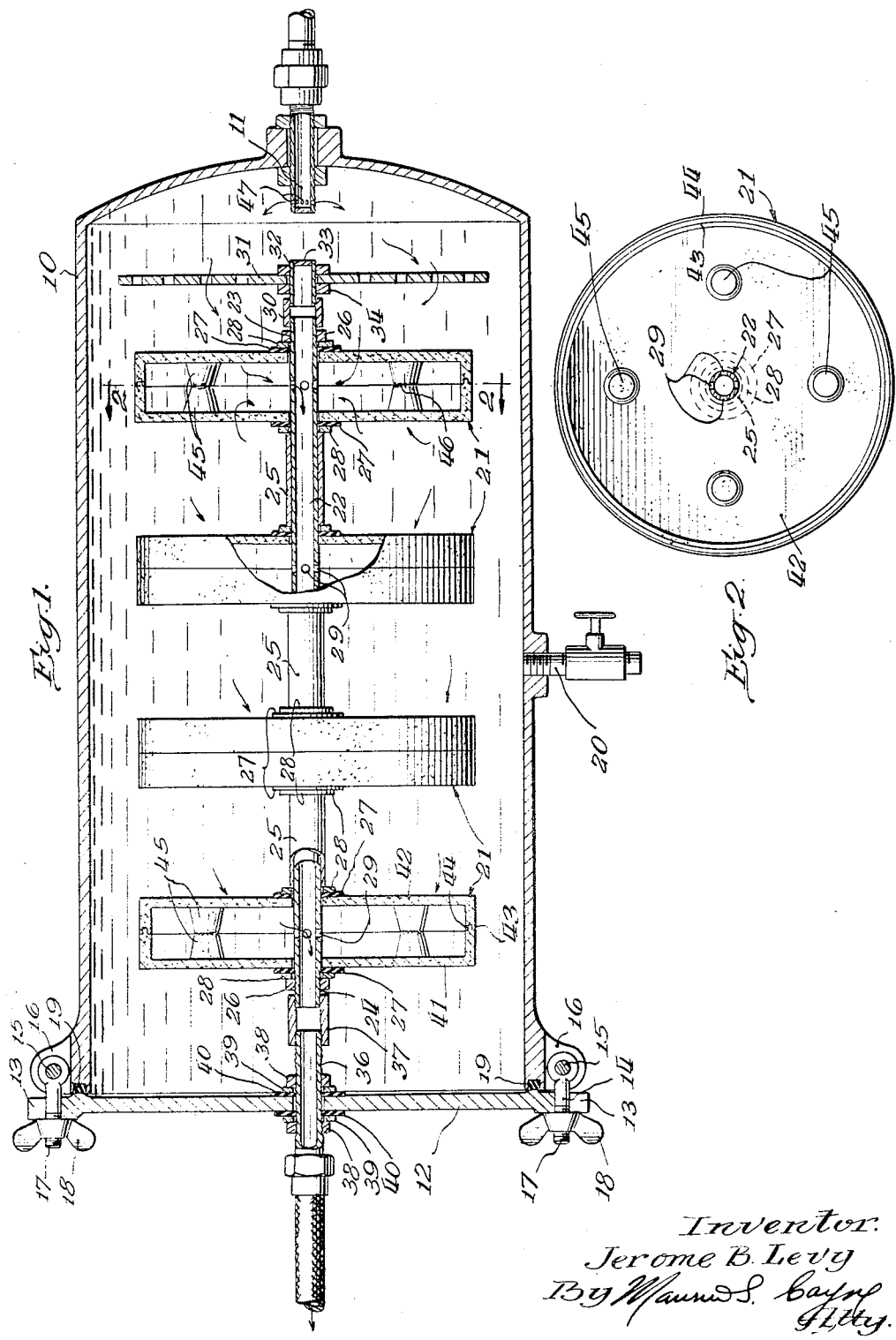

2,165,931

UNITED STATES PATENT OFFICE 2,165,931

HOLLOW DISK FILTER AID RETAINING MEDIUM

Jerome B. Levy, Chicago, Ill., assignor to Le Val Filter Company, Inc., Chicago, Ill., a corporation of Illinois Application January 31, 1938, Serial No. 187,806

2 Claims. (Cl. 210—120)

This invention relates generally to a filtering unit and more particularly to a filtering unit of the type employing a so-called "filter aid" and has for its main object the provision of a novel and improved arrangement of retaining medium for said filter aid.

The present invention is an improvement on the filter aid retaining medium disclosed in my co-pending application filed of even date herewith.

It is the main object of this invention to provide in a filtering unit of the character described a novel and improved filter aid retaining medium which will greatly increase the filtering capacity of the filtering unit without increasing the size of the filter tank. This result is accomplished by employing instead of a hollow cylinder as the filter aid retaining medium a plurality of spaced hollow disks formed of either natural or synthetic stone, said disks being arranged so that the entire outer surface thereof will act as a base upon which the filter cake may be built, thereby greatly increasing the filter area of the unit.

Another object of this invention is to provide in a filtering unit of the character described a novel and improved filter aid retaining medium which comprises one or more hollow disks formed of either natural or artificial porous stone and arranged in such a manner within the filter tank so that liquid may be forced into the hollow interior of said disks through substantially its entire outer surface.

A further object of this invention is to provide in a filtering unit of the character described a novel and improved filter aid retaining medium comprising a hollow member formed of either natural or artificial porous stone closed on all sides and being capable of permitting the building up of a filter cake on all of its sides whereby the entire outer surface of said hollow member will act as a filter aid retaining medium, thereby greatly increasing the effective filtering area of said member.

A still further object of this invention is to provide in a filtering unit of the character described a novel and improved filter aid retaining medium comprising a plurality of spaced hollow members formed of either natural or artificial stone having the property of filtering and polishing liquid passing therethrough, said hollow members being closed on all sides and being capable of permitting the building up of a filter cake on its entire outer surface.

A still further object of this invention is to provide in a filtering unit of the character described a novel and improved filter aid retaining medium comprising a plurality of hollow members formed of either natural or artificial stone having the property of filtering and polishing liquids passing therethrough and being capable of permitting the building up of a filter cake on its entire outer surface, all of said hollow members being mounted on a single element whereby all of said members may be readily removed as a unit from the filter tank whenever it becomes necessary or desirable to either replace or clean said members.

A still further object of this invention is to provide in a filtering unit of the character described a novel and improved filter aid retaining medium which will be simple in construction, assembly and operation, which may be produced along lines convenient for low cost manufacture, and which will at the same time be highly efficient for carrying out the purposes for which it is designed.

With the foregoing and other objects in view which will appear as the description proceeds, the invention consists in certain novel features of construction, arrangement and combination of parts hereinafter more fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Fig. 1 is a sectional view through a filtering unit embodying the principles of my invention.

Fig. 2 is a sectional view through one of the filter aid retaining members taken substantially on line 2—2 of Fig. 1.

Referring to the drawing more specifically by characters of reference, the numeral 10 designates a filter tank which may be formed of steel or the like, being porcelain coated on both sides and having at one end thereof an inlet 11 through which the unfiltered liquid may enter the tank 10. The opposite end of the tank 10 is open and is provided with a detachable cover 12, said cover being provided along its outer periphery with a plurality of spaced bifurcations 13 adapted for receiving the stems of pivotally mounted bolts 14, which bolts are pivotally secured as shown at 15 to eyes 16 formed on the body of the tank adjacent its open edge. The free ends of said bolts 14 are threaded as shown at 17 and are adapted to receive in threaded engagement suitable wing nuts 18 for securely fastening the cover in operative position to the tank. In order to assure a tight closure between the cover 12 and the tank 10, a suitable gasket 19 may be interposed between the upper free edge of the said tank and the under side of the cover 12. The tank 10 may also be provided in its bottom wall with a suitable drain outlet 20.

Disposed within the tank 10 are a plurality of filter aid retaining members of generally hollow disk formation, said members being designated by the reference character 21 and being formed of either natural or artificial stone of high porosity. Such stone is inert and will, therefore, not affect the color, taste or aroma of the liquid being filtered. The stone also has the property of both filtering and polishing the liquid forced therethrough.

For the purpose of illustration, I have shown in the drawing four such members 21 mounted within the tank 10 although obviously any number of such members may be employed, that is, one or more, depending upon the desired capacity of the filtering unit. In the embodiment illustrated, all of said members 21 are mounted on a single hollow pipe section 22, said pipe section being threaded adjacent its ends as shown at 23 and 24. The inner members 21 are spaced from each other and from their adjacent end members by means of the spacers or sleeves 25 and the end members 21 are secured to the pipe section 22 by means of the threaded nuts 26 threaded on the free threaded ends of said pipe section, there being interposed between said nuts and the body of the hollow member a gasket 27 and a washer 28. Similar gaskets 27 and washers 28 are interposed between the body of the hollow members 21 and their adjacent sleeves 25 whereby the openings in the hollow members through which the pipe section 22 passes will be effectively sealed against the passage of unfiltered liquid into said hollow members. That portion of the pipe section which is surrounded by each of the hollow members is provided with a plurality of circumferentially arranged openings 29 whereby filtered liquid will pass from the interior of said hollow members into the pipe section 22.

That end of the pipe section which is disposed adjacent the inlet 11 has secured thereto by means of the union 30 an annular perforated disk 31 of a size substantially equal to that of the diameter of the hollow members 21, said disk being secured to a threaded section of pipe 32, one end of which is closed as at 33 and to which it is securely locked by means of the nuts 34. The opposite end of the pipe section 22 has an outlet 36 secured thereto by means of the threaded union 37, said outlet 36 being securely fastened to the cover 12 by means of the nuts 38. The opening in the cover through which the section 36 passes is sealed against the passage of unfiltered liquid by means of the washers 39 and gaskets 40 provided on each side of the cover. Thus it will be noted that all of the filtering members or elements are secured to each other and to the cover 12 and the entire assembly may thus be removed by the removal of the cover 12.

Each of the filtering members 21 comprises a pair of cylindrical complementary cup shaped members 41 and 42, the member 41 having formed on its upper free edge a tongue 43 for engagement within a groove 44 formed on the member 42, said members being then joined to each other by any suitable cement or the like and when so joined form a tight union or joint. Each of the members 41 and 42 are also provided on their interiors with a plurality of spaced buttons or projections 45, the upper faces of said projections being adapted to contact each other when the two halves of the members are in assembled relation as shown more clearly in the drawing. In order to insure a more secure connection between the two members 41 and 42, a coating of suitable cement may be applied to the upper faces of said projections as shown at 46 in the drawing, said cement further aiding in holding the two halves of the members in assembled position.

The inlet 11 is provided with a plurality of circumferentially arranged openings 47 whereby the liquid coming out of said inlet will enter the tank radially. The plate 31 will act as a baffle to further aid in properly distributing the liquid entering the tank.

In operation, a small quantity of liquid will have a supply of filter aid added thereto, which filter aid will be effective for building up a pre-coat on each of the hollow members 21 and after the formation of said pre-coat the main body of the liquid may be passed into the tank, said pre-coat being effective for filtering out all solid material from said liquid. In the filtering operation, the unfiltered liquid from the tank 10 will pass through the filter cake and then through the hollow disks or members 21 to be filtered and polished thereby, and then from the interiors of said members the filtered liquid will pass through the openings 29 in the pipe section 22 and from there will pass into the outlet pipe 36.

It will be noted that by reason of the use of the hollow disks or members 21 as a filter aid retaining medium, a much greater filtering area may be produced in a tank of a given size than would be possible with filter aid retaining mediums of any other construction. This is true because of the fact that substantially the entire outer surface of the hollow members will be effective for holding the filter aid pre-coat as well as polishing and filtering the liquid after it has passed through the pre-coat.

It will also be noted that a filtering unit constructed in the manner hereinbefore disclosed is very flexible and will readily lend itself to the addition thereto or removal therefrom of additional filtering elements, all of which may be quickly accomplished with a minimum of labor and effort and with very little expense.

Furthermore, by mounting all of the elements as a unit and supporting the same from the detachable cover, it will be possible to quickly remove the entire unit by merely loosening and removing the cover, thus again greatly facilitating in the cleaning of the filtering elements or whenever their removal may become necessary or desirable.

It will be further noted that the arrangement of the filtering elements within the tank is such as to greatly facilitate in the assembly and disassembly without necessitating the dismantling of the entire filtering unit, thereby throwing the same out of operation for any considerable period of time. The specific construction of the filtering elements themselves and the material out of which the same are constructed is most suitable for the filtering of liquids of all kinds, as the material not only has the property of polishing and filtering the liquid passed therethrough, but also being inert will not affect the color, taste or aroma of the liquids. In addition thereto, the rigidity of the stone from which the filtering elements are constructed is such as to avoid vibration with the result that the danger of a portion of the pre-coat breaking away or in any other way being disturbed is practically eliminated.

It is believed that my invention, its mode of construction and assembly, and many of its advantages should be then readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A filter aid retaining member for a filtering unit of the character described, comprising a generally cylindrical hollow disk formed of a pair of complementary sections cemented to each other so as to form an unbroken surface for the passage of liquid therethrough, said complementary sections being provided with a plurality of spaced projections on their interiors, said projections on one section abutting against corresponding projections of said other complementary section for providing a relatively large cementing area within the formed member.

2. A filter aid retaining member for a filtering unit of the character described, comprising a generally cylindrical hollow disk formed of a pair of complementary sections cemented to each other so as to form an unbroken surface for the passage of liquid therethrough, said sections being provided upon their contacting edges with interfitting tongue and groove, a plurality of spaced projections provided on the interior of each of said sections, said projections arranged for abutment against corresponding projections of said complementary sections, whereby a large cementing area is produced within the formed member.

JEROME B. LEVY.